Patented Aug. 3, 1954

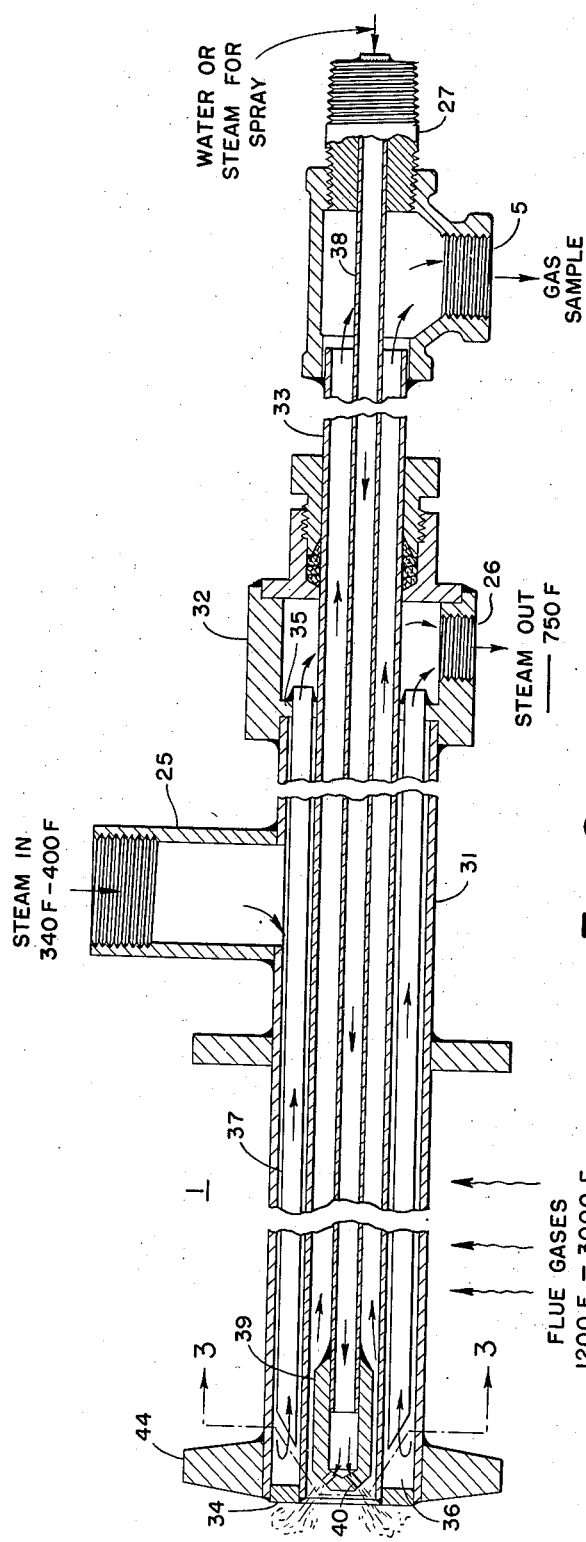
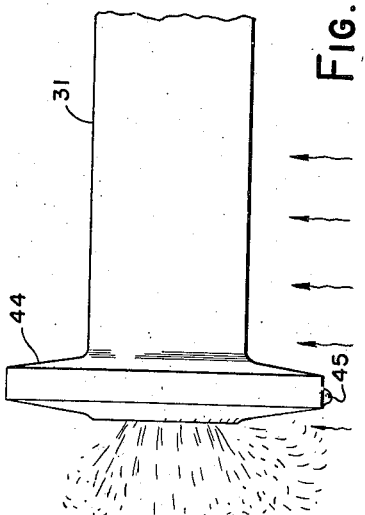
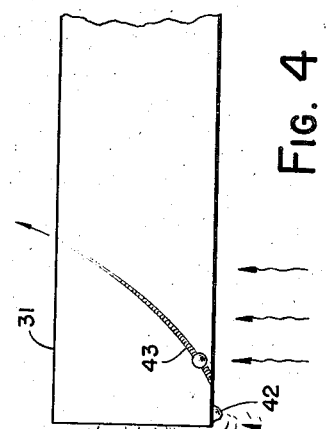
INVENTOR.
CLAYTON H. BARNARD

2,685,205

UNITED STATES PATENT OFFICE 2,685,205

GAS SAMPLING APPARATUS

Clayton H. Barnard, South Euclid, Ohio, assignor to Bailey Meter Company, a corporation of Delaware Application June 28, 1950, Serial No. 170,917

1 Claim. (Cl. 73—421.5)

This invention relates to gas sampling devices, and more particularly to apparatus for obtaining a continuous sample of the gases formed by the combustion of fuel.

The operation of a furnace, kiln, or any device in which the combustion of fuel takes place is sometimes determined by analyzing the gaseous products of combustion. A sample of the gases is obtained by extending a tube into the furnace or kiln and subjecting it to a suction produced by an aspirator. A large amount of dust is usually carried by the combustion gases and, in many cases, a substantial amount of water vapor is present. While a sample of the gases carrying dust and water vapor passes through that portion of the sampling tube which extends within the furnace, the temperature of the gases at that location is usually above their dew point and no difficulty is experienced by condensation within the sample piping.

As the sample passes from the furnace, the temperature soon drops below the dew point and the vapor condenses on the interior walls of the passage. Any dust carried with the sample stream then mixes with the moisture to form mud which soon begins to obstruct the passage. If water is introduced through the passage at the point of obstruction for washing the mud toward the aspirator, it will be found that the passage will then be cooled to the dew point in advance of the point where the water is introduced. An obstruction then forms at a location nearer the furnace. By introducing water to the sampling tube at a location near its open end, the dust will be wetted to form mud at this point; but if the water is directed in a stream opposite the flow of gases in the tube, the mud may be largely washed through the open end of the tube back into the furnace, while a smaller portion is wetted sufficiently by the water to be kept in a fluid state which will not obstruct the tube as it flows with the gases toward the aspirator. Before the gases can be analyzed they must be cleaned of foreign matter and then be freed of all moisture. By removing the greater part of the dust at the entrance to the sampling tube the washing of the gases is greatly simplified.

The temperatures within the furnace or kiln to which the sample tube is subjected are very high and may be in the range of 1200° F. to about 3000° F. The sample tube assembly, continuously subjected to a velocity flow of these high temperature gases, is susceptible to attack by impingement, erosion, corrosion, and temperature. Sampling pipes for this service have been constructed of the best known metallurgical alloys for withstanding such attack. In spite of the fact that the sample tube may be constructed of alloys costing a great many dollars per foot they have in the past lasted only a relatively short time before breaking through or disintegrating to the point of requiring replacement.

Sampling tubes have been constructed to include jacketing arrangements for forced circulation of cooling fluids, usually water, but this may tend to cool the gas sample stream below its dew point and cause corrosion of the interior and exterior surfaces, although tending to protect the exterior surface of the assembly from direct heat.

An object of my invention is to provide an improved means for sampling combustion gases. Another object is to provide an improved gas sampling tube having means for introducing water into the tube near its open end and in a direction opposite to the flow of gases. Still another object is to provide a gas sampling tube containing a nozzle for directing a conical shaped spray of water against its walls near its open end and in a direction opposite to the flow of gases. Still another object is to provide an improved gas sampling means including a tube having an open end adapted to be received within a furnace and means for introducing a spray of water into the tube near its open end.

A principal object is to provide a construction for a gas sampling tube wherein the jacketing for cooling is supplied with steam rather than a vaporizable liquid. Another principal object is to provide a deflection fin around the exterior of the tube at its inlet end. As will be pointed out later the particular function of the fin is to form a deflecting path for any of the spray fluid which would tend to be returned into a contact with the exterior wall of the sample pipe structure.

In the drawing:

Fig. 2 is an enlarged sectional view of the sampling device of Fig. 1.

Fig. 4 is a diagrammatic representation of the inlet end of a sampling device without the incorporation of one feature of my invention.

Fig. 5 is a view similar to that of Fig. 4 but including a feature of my invention.

Figures 1, 3:
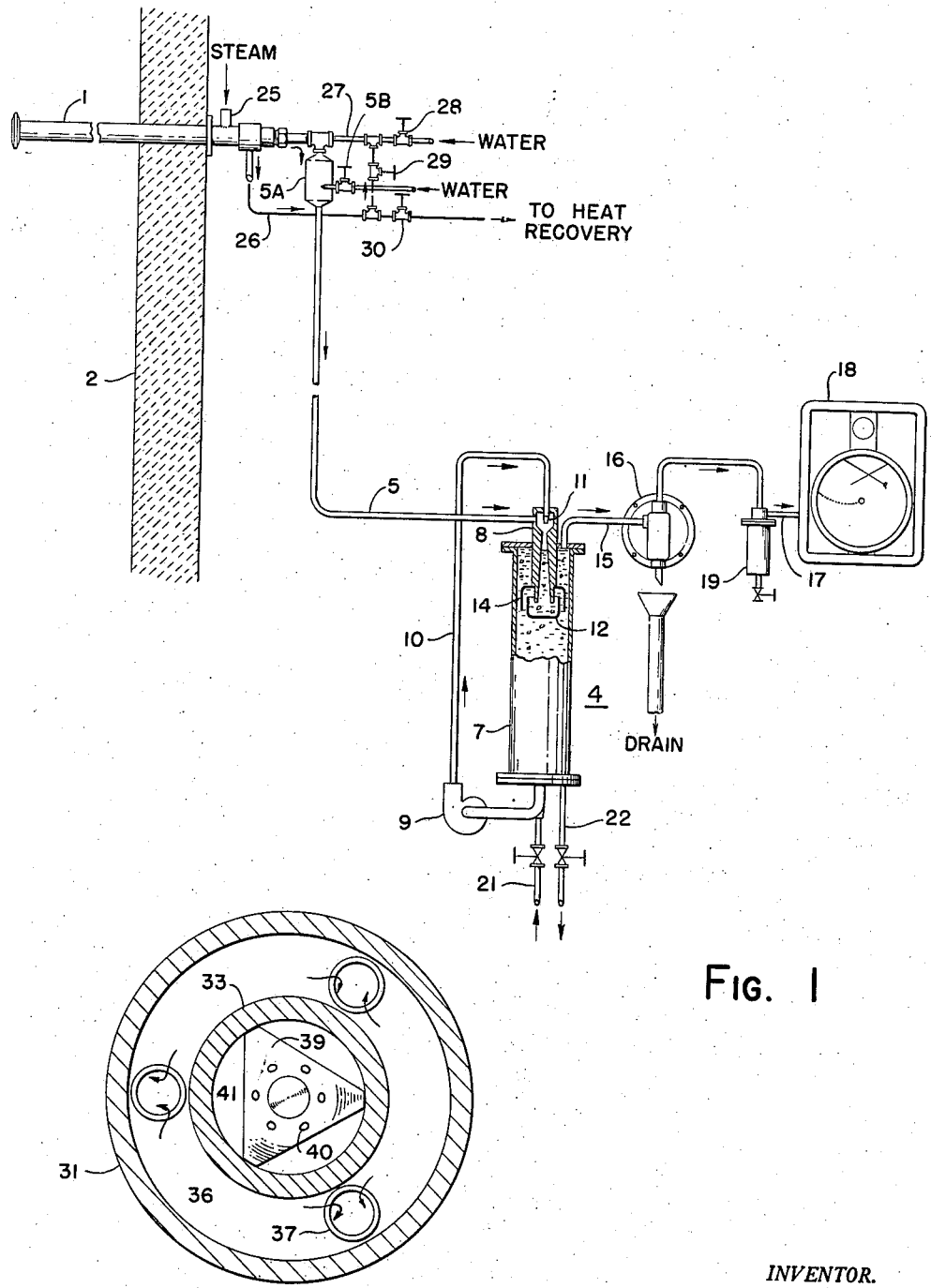
Fig. 1 is a schematic diagram of a gas analyzing system incorporating my improved sampling arrangement.
Fig. 3 is a view looking into the open end of the sampling device of Fig. 2 along the line 3—3.

My improved sampling device will be described in a system operating continuously to analyze the gaseous products of combustion from a furnace, and providing from the analysis a record of the percentage of free oxygen in the gases as an indication of the completeness of combustion or of the excess air supplied to burn the fuel in the furnace. The system is merely illustrative and is not to be considered limiting in any manner since my invention may be employed for sampling flue gases, exhaust gases from internal combustion engines, etc., and the analysis may be made to determine any desired constituent of the sample.

Referring to Fig. 1 it will be noted that there is shown an open end sampling tube 1 projecting through an opening in the wall 2 of a furnace into the path of the products of combustion. Located at the exterior of the furnace is a mechanism, generally designated 4, communicating with the sampling tube and cooling and dilution chamber 5A through a conduit 5, and producing an aspirating effect for taking a sample of the gases from the furnace.

Chamber 5A is essentially an enlarged section of conduit 5 into which water is introduced in a swirling manner. This water is in sufficient quantities and at a low enough temperature to mix with the sample gas and solid particles of foreign matter carried thereby that all water vapor in the sample will be condensed and acids formed with the products of the sample will be diluted. Dilution of these acids at this point protects the subsequent equipment from their otherwise corrosive effect.

The chamber 5A may be either of lead-lined, or other highly corrosive-resistant material, or of a relatively cheap, easily replaceable construction, depending on the economics involved in an individual installation. Therefore, my arrangement extracts the sample from a furnace, keeps its corrosive potentialities in abeyance until it is passed through chamber 5A and then suddenly precipitates the corrosive material and simultaneously dilutes it to protect following apparatus. A valve 5B controls the supply of water to chamber 5A.

The mechanism 4 comprises a tank 7 filled with water and having an aspirator cone 8 at its upper end. A centrifugal pump 9 driven by any suitable means, preferably an electric motor, takes water from the lower end of the tank and discharges it through a pipe 10 to a nozzle 11 at the entrance of the aspirator cone 8. The conduit 5 communicates with the cone in such relation to the nozzle 11 that the pressure flow of water leaving the nozzle and entering the cone produces a suction for drawing the gas and water mixture from the chamber 5A in a continuous stream. The mixture of water and gas leaving the cone impinges upon a disintegrator plate 12 completely breaking any bubbles of gas or slugs of water, and assisting in mixing the gas and water in finely divided form. The plate 12 is cupped to reverse the flow of water-gas mixture against an inverted cup 14, whereby the direction of travel of the liquid-gas mixture is again reversed. Emerging downwardly from the annulus formed by the cups 12 and 14 the mixture enters the main body of liquid in the tank and the gas rises to the top of the tank. A conduit 15 delivers the mixture of gas and water from the top of the tank to a separator 16 which largely removes the water. The gas is then conducted by a pipe 17 to an analyzer 18, and a filter 19 may be arranged in the pipe 17, if necessary to assure the complete removal of moisture and whatever solids may have been carried through the prior apparatus.

The mechanism 4 is desirably located as close to the furnace as is practical, and the analyzer 18, although it is shown close to the mechanism 4, may be located at a point distant from the sampling apparatus. It will be appreciated that the system between the mechanism 4 and the analyzer 18 is under pressure, and a small leak in the system would result only in a small loss from the excessively large gas sample. Since there is no possibility for air to enter this portion of the system and change the composition of the gas sample being analyzed, the distance between the apparatus 4 and the analyzer is limited only by the pressure drop and the pressure available from the pump 9.

Because of the pressure under which it is carried, a substantial amount of water is carried through the pipe 15 to the separator 16 and eventually to waste. This liquid must be continually supplied for proper operation from line 21 connected to any suitable source of water with a valve which may be left open just enough to give the supply necessary. A drain pipe 22 is provided for draining the tank of accumulated foreign matter or for continuously bleeding the tank a small amount.

In diagrammatic fashion, in Fig. 1, I show that the assembly 1 is supplied with steam as a cooling fluid through an inlet connection 25 and may leave the assembly through an outlet connection 26. A pipe 27 enters the assembly to supply fluid for the spray at the furnace end of the assembly 1. By means of a valve 28 in the water supply line, a valve 29 connected to the steam outlet pipe 26, and a valve 30, I may selectively use water or steam at the cone spray. With the valve 28 open and the valve 29 closed I may open the valve 30 and allow the cooling stem leaving the assembly 1 to pass to a heat recovery system.

The sampling tube assembly 1 is shown in sectional detail in Fig. 2. The assembly includes an outer tubular housing 31 terminating at one end in a chamber member 32. Concentric within the housing 31 is a tube 33 which passes through the chamber 32 to join the gas sample outlet 5.

At the furnace end of the assembly 1 the housing 31 is sealed to the tube 33 by a closure member 34 while within the chamber 32 the member 31 and tube 33 are sealed by a partition 35. Annular space between the tubes 31 and 33, and closed by the members 34, 35, defines a chamber 36 forming a cooling jacket for the assembly. Cooling fluid is admitted to the chamber 36 through the inlet connection 25 and bleeds through the connection 26.

The annular chamber 36 contains a plurality of smaller tubes 37 extending from the chamber 32, through the partition 35, to nearly reach the closure member 34. The path of flow of cooling fluid is shown by arrows as entering the connection 25, passing through the chamber 36 to the closure member 34 and then reversing its direction and passing through the small tubes 37 to the chamber 32 and out through the connection 26.

Centered within the tube 33 is a tube 38 terminating conduit 27 at the furnace. Near the sampling end of the assembly 1 the tube 38 carries a nozzle 39 having a plurality of spray openings 40. As has been diagrammatically shown in Fig. 2 the arrangement provides a conical spray of fluid passing from the holes 40 through the open end of tube 33 to provide a fluid curtain across the entrance to the interior of tube 33. The result is that with an aspirating action effective at conduit 5 a gas sample is drawn from the furnace through the fluid screening cone into the tube 33 and sample discharge line 5. Fig. 3 shows the general shape of the plug 39 which, in tube 33, forms a plurality of openings 41 for the sample to get past the nozzle 39. The cross-section of nozzle 39 in Fig. 2 has been taken in relation to the plurality of projections of nozzle 39 to show passage of the sample on both sides of the nozzle, between it and supporting tube 33.

At 27 I supply a fluid under pressure for forming the cone spray curtain. This may preferably be either water or steam. Under certain conditions of operation I prefer to use one while under other conditions of operation I prefer to use the other. In either event a small amount of the spray fluid may be carried along with the gas sample through the tube 33 to the cooling chamber 5A. As appreciated in the introductory remarks, depending upon the temperatures encountered and upon the nature of the cooling fluid within the chamber 36, a water spray may result in sufficient moisture being carried along with the gas sample as to form a collection of mud (with dust in the sample) at an undesirable location in the system. On the other hand I may under certain conditions desire to introduced enough water with the gas sample to effectively wash the mud along to some enlarged section of the piping where it can do no particular harm by way of obstructing small passages. Under some conditions of operation I may desirably use the steam curtain.

It will be appreciated that a primary purpose of the fluid curtain across the entrance area 41 is to keep as much dust out of the sample gas entering the tube 33 as is possible.

A particular feature of my present invention lies in the steam cooling of the assembly. As pointed out previously, if water is circulated through the chamber 36 it may cool the gas sample below its dew point at some location within the assembly where the moisture and acid condensations will rapidly eat away the tube material. On the other hand under certain temperature conditions such cooling water might be turned into steam at unpredictable points of its travel.

I have indicated that the sampling assembly 1 may be subjected to temperatures ranging from 1200° F. to about 3000° F. in the furnace. The various parts, even if of special alloys, would be extremely short lived when subjected to a velocity flow of flame and gases under these conditions. I preferably admit cooling steam at conduit 25 in a range of 100 p. s. i. to 200 p. s. i. which has a saturated temperature in the range of 340° F. to 400° F. Under this condition the steam leaving the connection 26 may be at a temperature of around 700° F. to 770° F. While these various temperatures are cited merely by way of example it will be understood that they are not limiting.

In Fig. 1 I have indicated that I may use a portion of the steam leaving location 26 for entry to pipe 27 to form the screen curtain across the entrance or open end of tube 33. On the other hand I may desirably connect the steam outlet 26 to a heater or other point of heat recovery.

I have found that when a conical curtain of water is projected across the sample entering open end of tube 33 there is a tendency for water droplets to be swept back against the exterior surface of the tubular housing 31. I have diagrammatically indicated this condition in Fig. 4 where the water particles 42 may be swept back against the surface of the tube 31 by the velocity flow of gases. I have found that this undoubtedly occurs as evidenced by an actual eating away of the metal of tubular housing 31 along some path as indicated at 43. As a matter of fact I have found that in some cases the housing is completely worn through at some location such as 43 and I can only attribute the action of corrosion, erosion or similar action by particles of the spray fluid forming acids with the furnace gases. Inasmuch as such attack results in a very expensive replacement of the entire sampling device it is serious.

A particular feature of my present invention resides in constructing the assembly 1 in the manner shown in Figs. 1, 2 and 5 wherein a disc or fin 44 is built up around the furnace end of the housing 31. As shown in Fig. 5 this results in any droplets of the curtain screen possibly reaching the position shown at 45 before being swept away or vaporized but in no event being swept along a path of 43 on the exterior of the tubing 31. That this is so I have proven by the fact that my improved construction shows no signs of such erosion or wear on the surface of housing 31 after being in service a considerable length of time.

The ring 44 may be built up of weld metal or may be a relatively cheap grade of steel and it may readily be built up or replenished if there is any burning away or deterioration shows up in any form. The temperature at location 45 is greater than at the surface of housing 31 and this tends to vaporize any droplets which may reach that point.

While I have illustrated and described certain preferred forms of my invention, it will be understood that I am not limited to the material or temperatures named.

What I claim as new, and desire to secure by Letters Patent of the United States, is:

Apparatus for extracting a sample of heated gas from a flow path of the gas including, a tube arranged with an open end located in the path of the heated gas and its other end connected to a source of suction, a support for holding the tube in a position substantially normal to the path of the heated gas, a nozzle and conduit in the tube for ejecting fluid toward the open end, a jacket for a cooling medium surrounding the tube, and a solid metallic disc annularly secured to the outer periphery of the jacket at the open end of the tube to provide a surface heated by the gases from which the sample is drawn upon which ejected fluid from the tube will be evaporated.

References Cited in the file of this patent

UNITED STATES PATENTS

| Number | Name | Date |
|---|---|---|
| 2,058,118 | White | Oct. 20, 1936 |
| 2,192,215 | Williams | Mar. 5, 1940 |
| 2,208,989 | Lewis | July 23, 1940 |
| 2,243,451 | Bauer | May 27, 1941 |
| 2,356,845 | Hines | Aug. 29, 1944 |
| 2,499,358 | Cooper et al. | Mar. 7, 1950 |
| 2,550,933 | McEvoy | May 1, 1951 |